US011780511B2

(12) United States Patent
Wang et al.

(10) Patent No.: US 11,780,511 B2
(45) Date of Patent: Oct. 10, 2023

(54) ACTIVE FRONT WHEEL DEFLECTOR ASSEMBLY

(71) Applicants: Magna Exteriors Inc., Concord (CA); Jeffrey E. May, Warren, MI (US)

(72) Inventors: Yao Wang, Troy, MI (US); Jeffrey E. May, Warren, MI (US); Thomas E. Cobb, Clinton Township, MI (US); Martin R. Matthews, Troy, MI (US); Braendon R. Lindberg, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 16/973,703

(22) PCT Filed: Jun. 18, 2019

(86) PCT No.: PCT/US2019/037785
§ 371 (c)(1),
(2) Date: Dec. 9, 2020

(87) PCT Pub. No.: WO2019/246137
PCT Pub. Date: Dec. 26, 2019

(65) Prior Publication Data
US 2021/0253182 A1    Aug. 19, 2021

Related U.S. Application Data

(60) Provisional application No. 62/686,271, filed on Jun. 18, 2018.

(51) Int. Cl.
*B62D 35/00* (2006.01)
*B62D 35/02* (2006.01)
(Continued)

(52) U.S. Cl.
CPC .............. *B62D 35/005* (2013.01); *B60J 1/20* (2013.01); *B60J 10/72* (2016.02); *B60J 10/767* (2016.02);
(Continued)

(58) Field of Classification Search
CPC ....... B62D 35/005; B62D 35/02; B62D 37/02
(Continued)

(56) References Cited

U.S. PATENT DOCUMENTS 8,702,152 B1    4/2014  Platto et al.
10,343,610 B2 *  7/2019  Long ...................... B60R 3/002
(Continued)

FOREIGN PATENT DOCUMENTS

CN    103921852 A    7/2014
CN    106103163 A    11/2016
(Continued)

OTHER PUBLICATIONS

English translation of FR 3 048 671; retrieved via PatentTranslate located at www.epo.org. (Year: 2023).*
(Continued)

*Primary Examiner* — Jason S Daniels
(74) *Attorney, Agent, or Firm* — Warn Partners, P.C.

(57) ABSTRACT

An active front wheel deflector assembly (10) including a deflector panel (20) moveable between a stowed position and at least one deployed position wherein the deployment of the deflector panel (20) moves the deflector panel (20) into an airflow to direct air and improves aerodynamics. The active front wheel deflector assembly (10) combines linear actuation with rotational motion.

18 Claims, 6 Drawing Sheets

(51) Int. Cl.
  *B60J 10/72* (2016.01)
  *B60J 10/767* (2016.01)
  *B60J 1/20* (2006.01)
  *B62D 37/02* (2006.01)
(52) U.S. Cl.
  CPC ........... *B62D 35/008* (2013.01); *B62D 35/02* (2013.01); *B62D 37/02* (2013.01)
(58) Field of Classification Search
  USPC ............................... 296/180.1, 180.2, 180.3
  See application file for complete search history.

(56) References Cited

U.S. PATENT DOCUMENTS

| | | | |
|---|---|---|---|
| 10,953,933 B2 * | 3/2021 | Schmitt | B62D 35/005 |
| 2015/0076860 A1 * | 3/2015 | Rettig | B62D 35/02 91/55 |
| 2017/0299006 A1 * | 10/2017 | Shi | B60T 5/00 |
| 2018/0154952 A1 | 6/2018 | Klop et al. | |
| 2018/0162459 A1 * | 6/2018 | Abdoul Azizou | B62D 35/02 |
| 2019/0039663 A1 * | 2/2019 | Bray | B60T 17/22 |
| 2019/0118872 A1 * | 4/2019 | Shiga | B62D 37/02 |

FOREIGN PATENT DOCUMENTS

| | | | | |
|---|---|---|---|---|
| CN | 106536334 A | | 3/2017 | |
| DE | 102017214769 A1 | * | 2/2019 | ........... B62D 35/005 |
| FR | 3048671 A1 | * | 9/2017 | ........... B62D 35/005 |
| JP | H05105124 A | | 4/1993 | |
| JP | H08216937 A | | 8/1996 | |
| JP | 2007030549 A | | 2/2007 | |
| JP | 2017052338 A | | 3/2017 | |
| WO | 2015191697 A2 | | 12/2015 | |

OTHER PUBLICATIONS

International Search Report for PCT/US2019/037785 dated Oct. 3, 2019.
Search Report for China Application No. 201980040857.7 dated Jun. 16, 2022, 2-pages.
Search Report for China Application No. 201980040857.7 dated Mar. 7, 2023, 2-pages.

* cited by examiner

ACTIVE FRONT WHEEL DEFLECTOR ASSEMBLY

CROSS-REFERENCE TO RELATED APPLICATIONS

This application is a National Stage of PCT International Application No. PCT/US2019/037785, filed Jun. 18, 2019, which claims the benefit of U.S. Provisional Patent Application No. 62/686,271, filed Jun. 18, 2018. The disclosures of the above applications are incorporated herein by reference.

FIELD OF THE INVENTION

The present invention relates to an active front wheel deflector including linear actuation with rotational motion for automotive applications.

BACKGROUND OF THE INVENTION

There is a considerable loss of aerodynamic efficiency in vehicles due to the airflow underneath the vehicle and in front of the front wheels. Conventional structures, such as fixed panels or fixed air deflectors/dams using flexible materials, are known and do not meet desired requirements that is durable and aerodynamically effective. These fixed air deflector/dams are still a compromise as they cannot be made to the optimum height without compromising specifications and compromising to other vehicle capabilities. Further, these air dams, even when flexible, are still damaged during off-roading or when added ground clearance is needed. Further, these dams do not offer active wheel spats or combination of deflective panel and wheel spats selectively deployed individually or together, when desired.

In general, pressure in front of the tires increases drag, causing more fuel consumption. Traditional tire deflectors can only extend a certain height due to styling, damageability and other constraints. Known fixed wheel deflectors are limited as to height and shape, e.g., due to ground clearance parameters. Conventional active air deflectors are not close to front wheels and limited as to package space. Active front wheel deflectors only move vertically, and have higher packaging space.

Accordingly, there is a desire for improve vehicle aerodynamics by smoothing air flow generally in front of the tires and the underbody airflow. In particular, an active front wheel deflector that provides an aerodynamic surface for improved aerodynamic when deployed, but is retractable out of the way under predetermined conditions to return the vehicle to its initial design intent.

SUMMARY OF THE INVENTION

There is provided an aerodynamic surface which improves aerodynamics when deployed and is retractable out of the way to return the vehicle to its initial design intent. In particular, an active front wheel deflector assembly including linear actuation with rotational motion.

The Active front wheel deflector is moveable, thus, the height can be optimized. The active front wheel deflector assembly of the present invention with rotational motion requires less packaging space than the linear motion ones. The active front wheel deflector assembly compared to fixed or other front air deflectors, provides more benefits and applicable to a wider range of vehicles.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-8 generally, there is depicted an active front wheel deflector assembly, shown generally at 10, operably mounted to the vehicle 12 adjacent to, preferably substantially in front of, the front tires 14 of the vehicle 12. The assembly 10 improves vehicle aerodynamics by smoothing the flow of turbulent air in front of the tires and the underbody airflow.

The active front wheel deflector assembly 10 provides a linear actuator combined with a rotational motion. A deflector portion 16 including at least one deflector is provided. Preferably, the deflector portion 16 includes at least one first panel 18, most preferably a static panel, and at least one second panel 20 that is a movable deflector. At least the second panel 20 is moveable to at least one predetermined height in a deployed position and a predetermined height in a stowed position, which predetermined heights can be optimized suitable for the particular application. The active front wheel deflector assembly 10 with rotational motion requires less packaging space than linear motion systems, which is a significant advantage over conventional systems. The active front wheel deflector assembly 10 provides more benefits and applicability to a wider range of vehicles than conventional front air deflectors, such as fixed wheel deflectors that are limited to height and shape, active deflectors that are not adjacent, or close, to wheels and that are limited to the package space, and linear active front wheel deflectors that only move vertically and have greater packaging space requirements.

The active front wheel deflector assembly 10 includes a frame shown generally at 22, including a housing 23. Preferably, the frame 22 is a static actuator mount and frame.

At least one pivot pin 24 is operably coupled to the frame 22 at at least one pivot joint shown generally at 25. Most preferably, the pivot joint 25 is formed by the first panel 18 and the second panel 20 held by said pivot pin 24 such that said second panel 20 is rotatable at said pivot joint 25 (e.g., see FIGS. 6-8). The deflector panel 20 rotates around the pivot pin 24, as indicated at arrow "R", for moving the panel 20 between the stowed and deployed positions. It is understood that any alternative joint suitable for rotation of the deflector panel 20 is contemplated depending on the application without departure from the scope of the present invention.

The active front wheel deflector assembly 10 includes an actuator shown generally at 26, most preferably, a linear actuator. The actuator 26 is operably coupled to the frame 22. The actuator 22 incorporates a shaft 28, (e.g., a threaded shaft, spindle, threaded spindle, lead screw, rotating screw, etc) received within an inner tube 30 (e.g., extension tube, translating tube, etc) located within an outer tube portion 32 of the housing 23. The shaft 28 operably rotated to translate within the inner tube 30 to extend/retract the deflector panel 20. Under power, e.g., by a motor 29, the translating shaft 28 moves, e.g., up/down, within the inner tube 30 to extend/retract the deflector panel 20. The linear actuator motion is indicated at arrow "A". Preferably, at least one second pivot pin 36 is operably coupled to the frame 22 at at least one joint shown generally at 34. A sleeve 38 is provided over part of the shaft 28 to protect the shaft 28 from environmental elements, e.g., moisture, dirt, debris, salt, road deicer, etc. It is understood that alternative directions/angles of translation suitable for deploying the panel 20 to at least one predetermined position/height are contemplated depending on the application without departure from the scope of the present invention.

Most preferably, there are at least two active front wheel deflector assemblies 10 operably connected to the vehicle by at least one fastener, each assembly 10 located adjacent to, preferably substantially in front of, the front wheels of the vehicle. The assembly 10 depicted in the figures and attached to the vehicle will, therefore, have a mirror image assembly 10 attached adjacent to the other of the front tires of the vehicle and the assemblies 10 deploy/retract at the same time under predetermined conditions. It is understood that the assemblies 10 can operate independently. It is further understood that the assemblies 10 can incorporate object detection operable for detection for retracting or otherwise moving out of the way when an object or strike with a surface is detected to that particular assembly 10, e.g., by current spike, without departure from the scope of the present invention.

In the deployed position (e.g., see FIGS. 3-7, more particularly FIG. 4), the wheel deflector 20 is down to deflect the flow of air, most preferably, to deflect the flow around the front wheels 14. The actuator 26 and the static frame 22 are fixed.

For movement from at least one deployed position to the stowed position (e.g., see FIG. 2), the linear actuator 26 receives electrical power which causes the actuator 26 to shorten in length (upward direction of motion "A"). This shortening action causes rotation "R" along the pivot axis 24,25 as the wheel deflector panel 20 is lifted to no longer be in the air flow.

Figure 2:
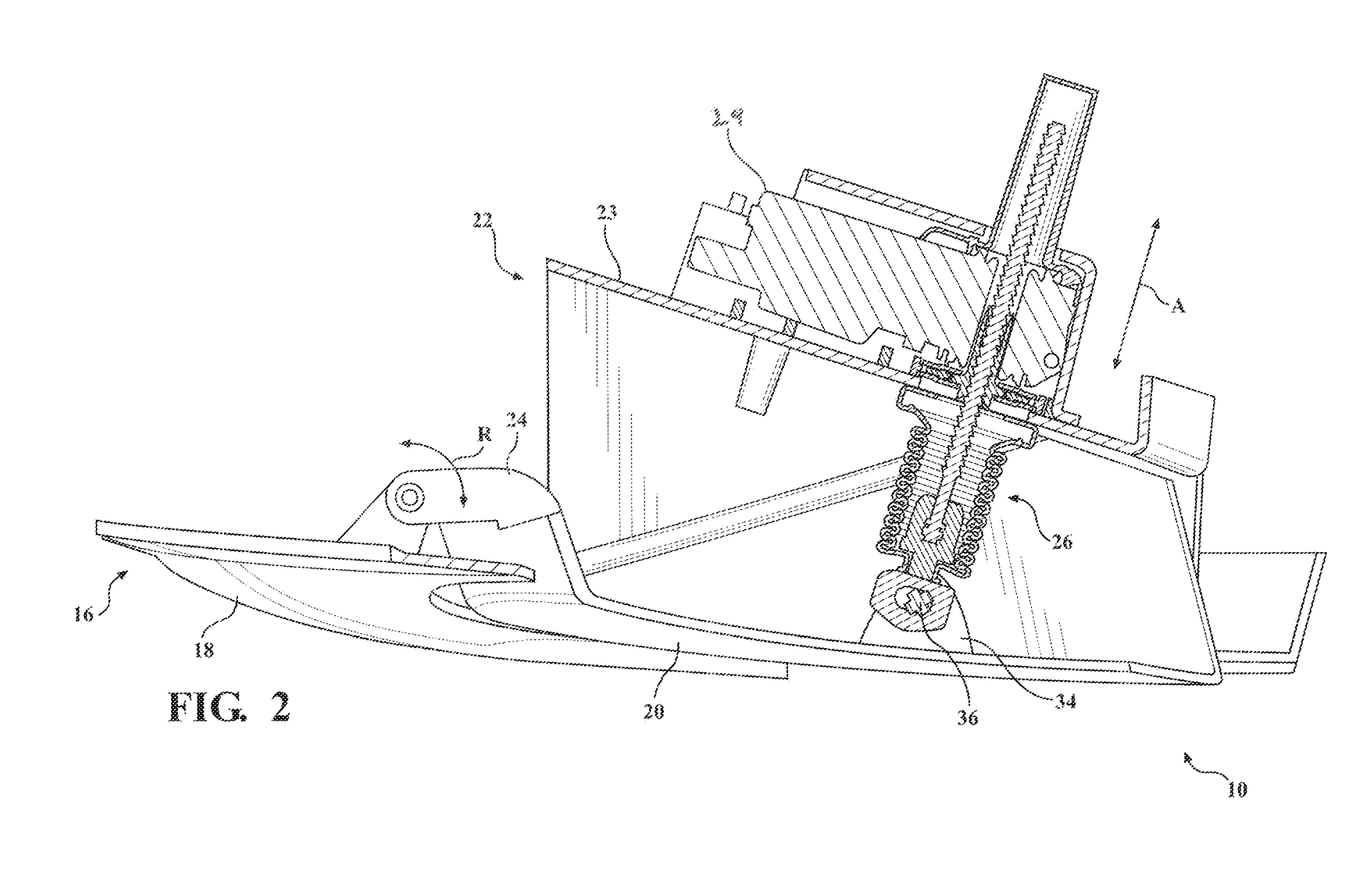
FIG. 2, is a sectional side elevation view of the active front wheel deflector in a retracted position, in accordance with the present invention.
Figure 3:
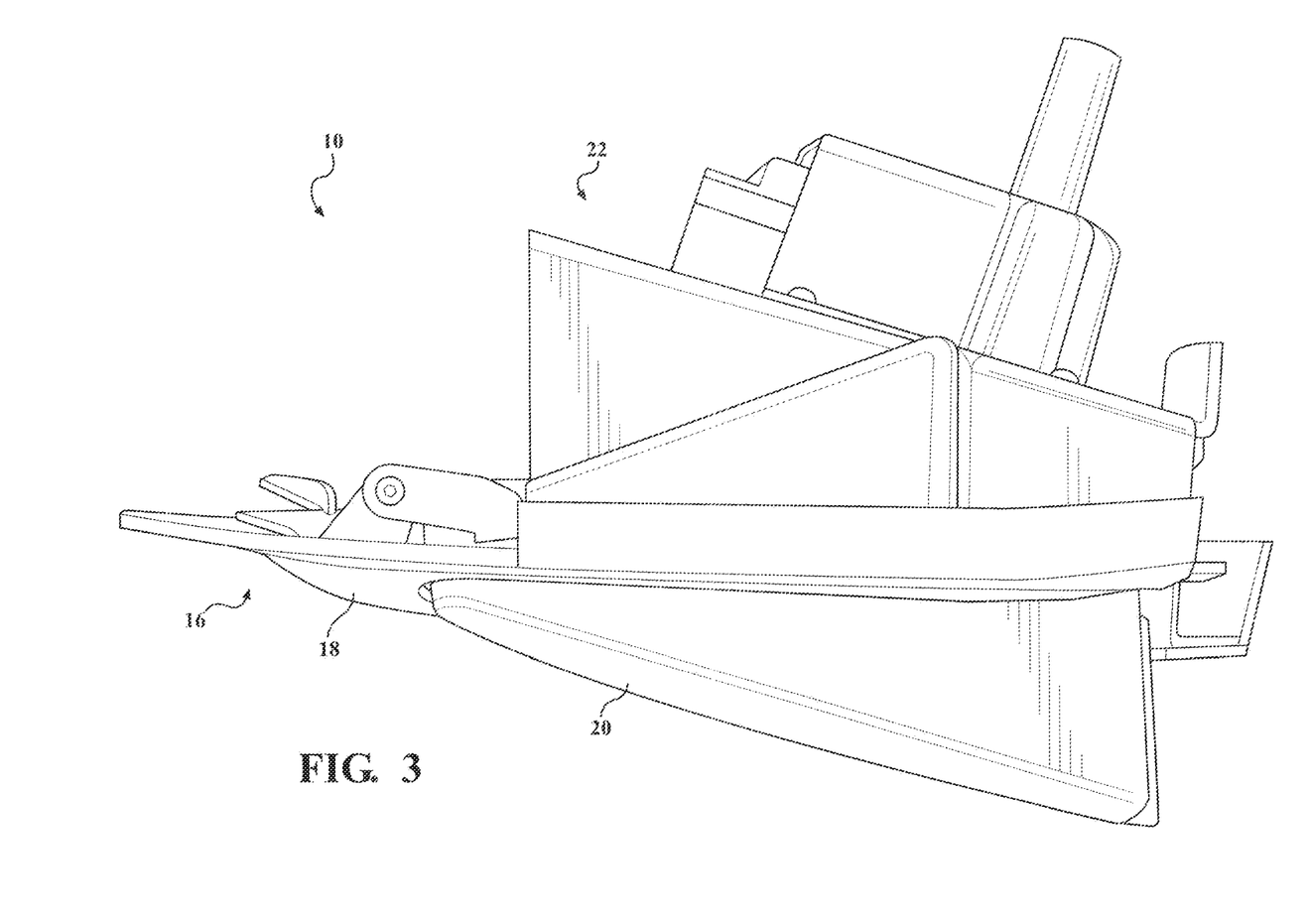
FIG. 3 is a right side elevation view of the active front wheel deflector in a deployed position, in accordance with the present invention.
Figure 4:
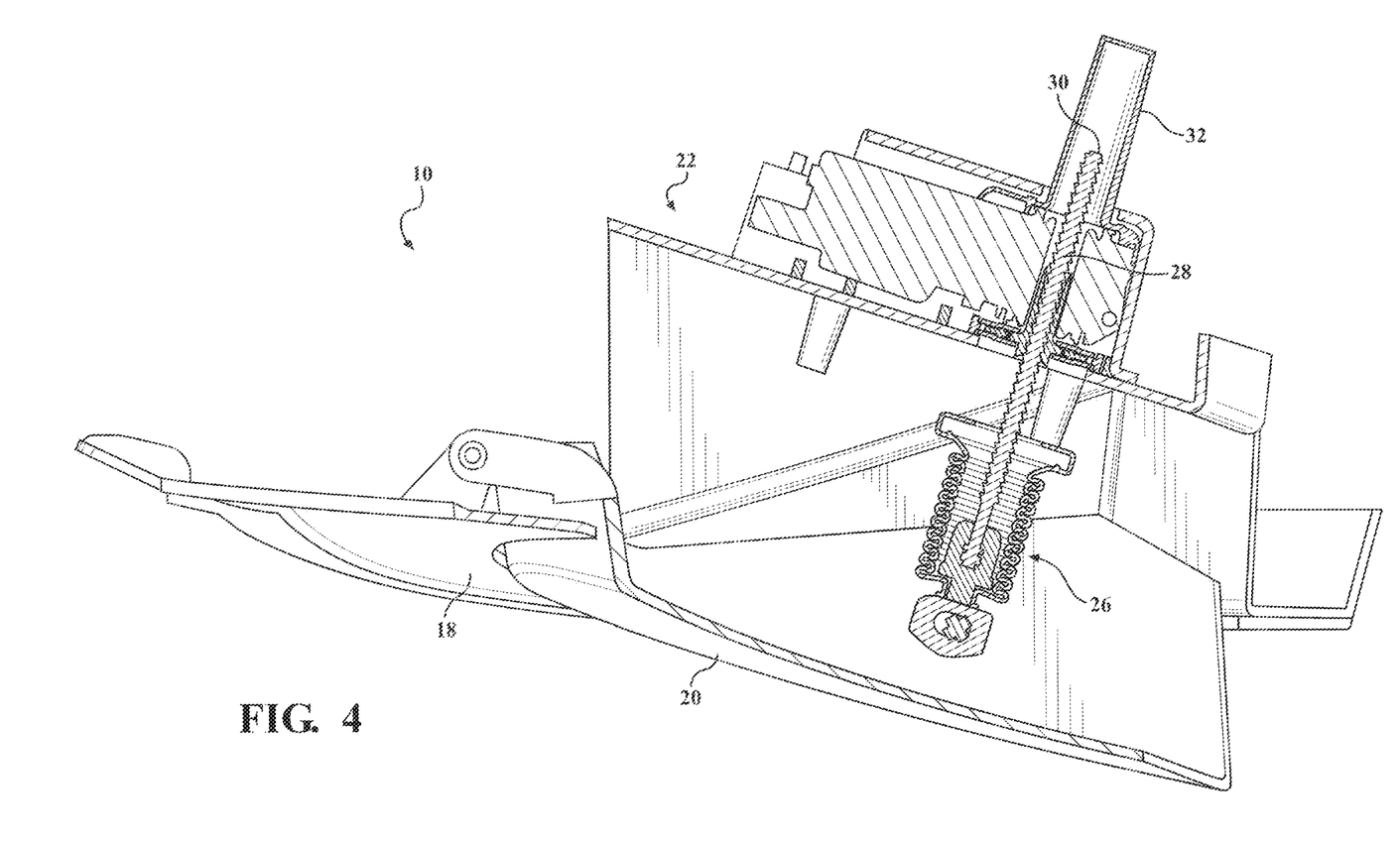
FIG. 4 is a sectional side elevation view of the active front wheel deflector in the deployed position, in accordance with the present invention.
Figure 5:
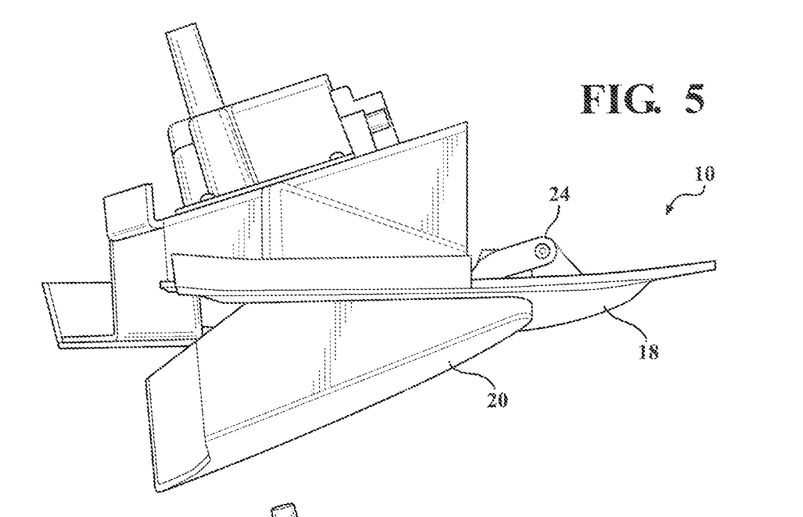
FIG. 5 is a left side elevation view of the active front wheel deflector in the deployed position, in accordance with the present invention.
Figure 6:
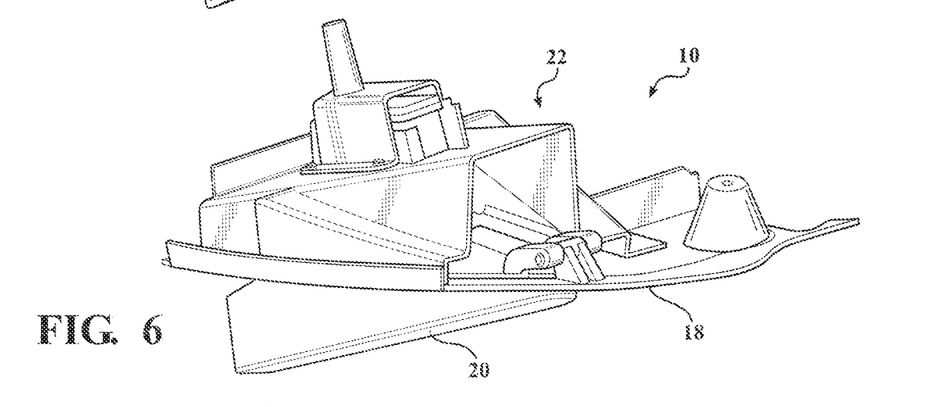
FIG. 6 is a perspective view of the active front wheel deflector in the deployed position, in accordance with the present invention.
Figure 7:
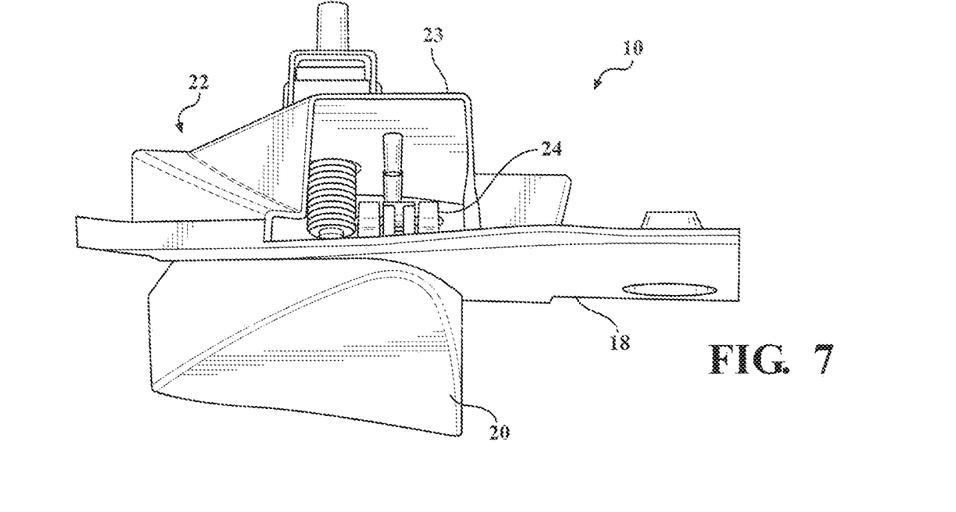
FIG. 7 is a front elevation view of the active front wheel deflector in the deployed position, in accordance with the present invention.
Figure 8:
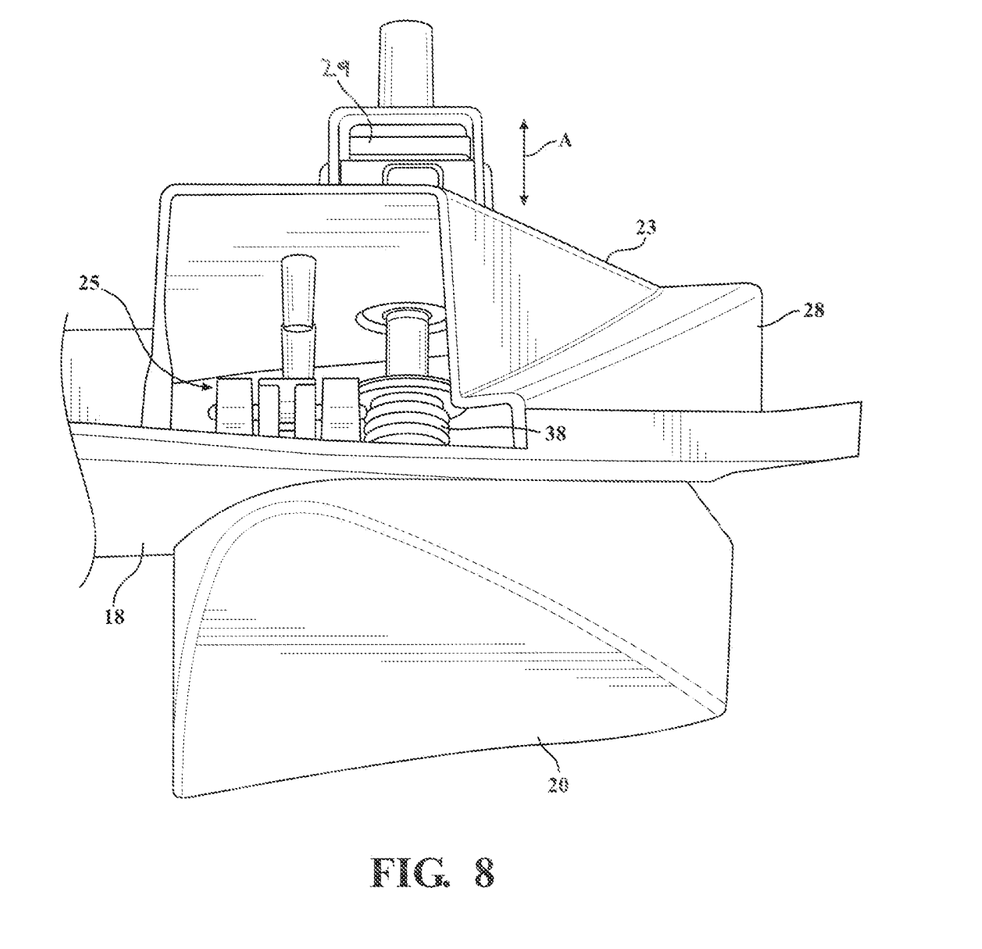
FIG. 8 is an elevation view of the active front wheel deflector in the deployed position, in accordance with the present invention.

For movement from the stowed position to the at least one deployed position, the linear actuator 26 receives electrical power which causes the actuator 26 to lengthen (downward direction of motion "A"). This lengthening action causes rotation "R" along the pivot axis 24,25 as the wheel deflector panel 20 is lowered a predetermined amount to be in the air flow.

Referring to the FIGS. 1-8 generally, the ability of the aerodynamic shield to be lifted substantially out of the air flow under the vehicle when not needed provides the needed ground clearance for the vehicle under predetermined conditions, e.g., at lower speeds, e.g., about 30 Mph. At other predetermined conditions, e.g., higher speeds, e.g., greater than at least about 30 Mph, when the aerodynamic benefits are needed more, the deflector 20 can be deployed to improve aerodynamics by directing air flow, resulting in lower fuel consumption.

Object detection and suitable sensors are contemplated without departure from the scope of the present invention.

Suitable electronics are contemplated to sense and communicate current strikes, e.g., such as with object/ground surface contact.

Suitable electronics, sensors, communication or any other suitable device is contemplated for determining if predetermined conditions exist, e.g., yaw, vehicle speed, clearance height, etc to deploy/retract the deflector panel 20 when the predetermined conditions exist.

Predetermined conditions include, but are not limited to, selected from vehicle speed, wind direction, e.g., average wind direction is unfavorably about 5° yaw, and any other predetermined condition depending on the application, etc. By way of example, the panel is stowed and when the vehicle reaches a predetermined speed, e.g., about 30-40 mph, at least about 30 mph, etc, the assembly 10 moves the panel 20 to the deployed position and stays down until the vehicle drops back down to below the predetermined speed or other predetermined conditions for continued deployment are no longer met.

The actuator 26 preferably operably correlates with vehicle communication networks for commanding operation of the actuator based upon predetermined conditions.

The aerodynamic panel 20 can be any predetermined shape suitable for directing/smoothing air flow. By way of non-limiting example, substantially straight, curved or angled relative to the vehicle depending on the application. By way of non-limiting example, the shield is angled outboard at the forward end or rearward end. By way of another non-limiting example, the deflector panel 20 is moved to angle downward with greatest height at the rearward end (aft direction of vehicle).

Preferably, the wheel deflector panel 20 is made of a composite plastic. However, it is also within the scope of the invention to manufacture the wheel deflector panel 20 of different materials such as steel or aluminum, depending on the particular application, painted carbon fiber, extruded rubber, molded composite plastic, single piece, or multiple pieces assembled together or other suitable impact resistant material and combinations thereof to withstand a predetermined load without departing from the scope of the invention. Additionally, the deflector panel 1 may consist of a single piece, e.g., of molded composite plastic, or multiple pieces assembled together.

Figure 1:
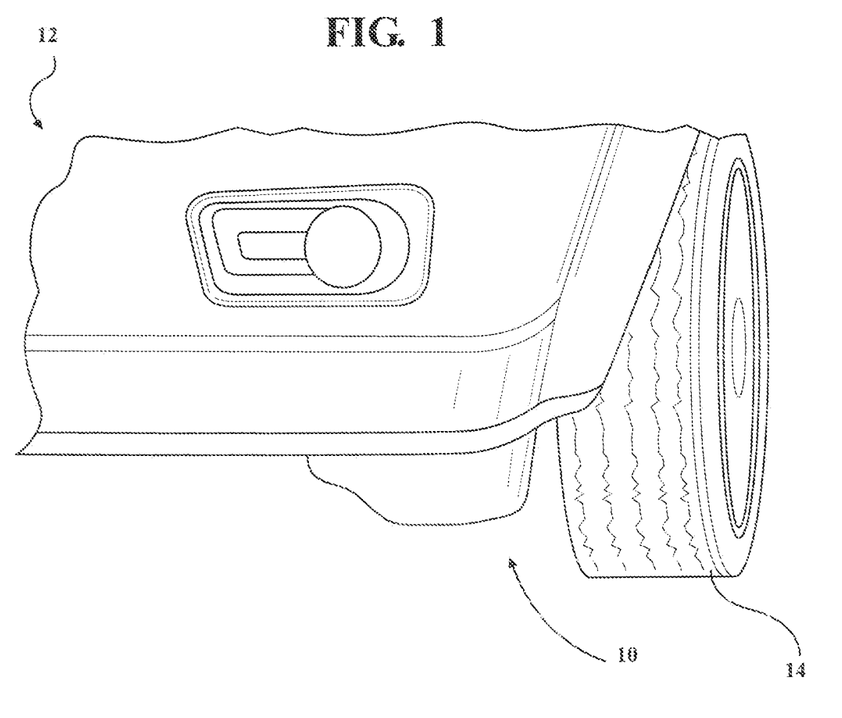
FIG. 1 is a perspective of an active front wheel deflector shown in an environment of use connected to a vehicle, in accordance with the present invention.

FIG. 1 depicts the active front wheel deflector assembly 10 in an environment of use. It is understood that any predetermined mounted location suitable for improving aerodynamics is contemplated depending on the application without departure from the scope of the present invention. It is further understood that adaptability to an vehicle, e.g., sedan, sport utility vehicle, UTV, ATV, RV, pickup truck, semi-truck, crossover, etc. is contemplated without departure from the scope of the present invention. It is further understood that any predetermined height(s) of deployment/stowage of the panel from the ground surface, e.g., roadway, is contemplated without departure from the scope of the present invention. It is further understood that any predetermined angle(s) of deployment/stowage of the panel relative to the ground surface, e.g., roadway, is contemplated without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A front wheel deflector assembly adapted for a vehicle, comprising:
    at least one deflector panel moveable between a stowed position and at least one deployed position wherein the deployment of the deflector panel improves aerodynamics;
    at least one deflector pivot, said at least one deflector panel rotatable about said deflector pivot;
    at least one mounting frame member located underneath the vehicle and adapted to operably connect underneath the vehicle;
    at least one linear actuator operably coupled to said at least one deflector panel, wherein linear actuation combined with rotational motion of said at least one deflector panel selectively moves said at least one deflector panel between said stowed position out of a direct air flow and said at least one deployed position into an air flow under predetermined conditions and
    wherein said linear actuator includes a threaded shaft operably coupled to said at least one deflector panel, said shaft operably translates within a static inner tube formed in a fixed housing of said at least one mounting frame member at a predetermined angle from vertical to selectively increase/decrease the height of said linear actuator to extend/retract said at least one deflector panel.

2. The front wheel deflector assembly of claim 1, further comprising at least one static actuator mount and frame, said frame including a housing operably connected to the vehicle adjacent to a front wheel of said vehicle for selectively moving said at least one deflector panel into/out of said air flow.

3. The front wheel deflector assembly of claim 1, further comprising at least one static panel operably coupled to said at least one mounting frame member.

4. The front wheel deflector assembly of claim 3, wherein said at least one static panel forms at least one pivot joint and said at least one deflector panel is rotatably connected at said pivot joint for moving for selectively moving said at least one deflector panel into/out of said air flow.

5. The front wheel deflector assembly of claim 4, wherein said at least one pivot joint includes a pivot pin for said at least one deflector panel to rotate about said pivot joint.

6. The front wheel deflector assembly of claim 1, further comprising at least one fixed panel that forms a pivot joint and said at least one deflector panel is rotatably connected at said pivot joint, wherein said at least one deflector panel rotates about said pivot joint in a first direction when said linear actuator height increases to place said at least one deflector panel into said air flow, and wherein said at least one deflector panel rotates about said pivot joint in a second direction when said linear actuator height decreases to removes said at least one deflector panel from said air flow.

7. The front wheel deflector assembly of claim 1, wherein the predetermined conditions are selected from the group consisting of vehicle speed, wind direction, yaw, and combinations thereof.

8. The front wheel deflector assembly of claim 1, wherein the predetermined condition for deploying the deflector panel is when the vehicle speed reaches at least about 30 miles per hour.

9. The front wheel deflector assembly of claim 1, wherein each of a front wheel deflector assembly is mounted substantially in front of both front wheel tires of said vehicle, respectively.

10. The front wheel deflector assembly of claim 1, wherein said linear actuator senses current spike upon impact at a predetermined force causing circuit override for stopping deployment of said at least one deflector panel to prevent damage.

11. The front wheel deflector assembly of claim 1, wherein said linear actuator operably receives electrical power, causing said linear actuator to shorten in length, which draws the at least one deflector panel upward as the deflector panel rotates about a pivot joint in a first direction, thereby moving the at least one deflector panel to the stowed position, and wherein said linear actuator operably receives electrical power, causing said linear actuator to lengthen, which drives the at least one deflector panel downward as the deflector panel rotates about a pivot joint in a second direction, thereby moving the at least one deflector panel to at least one deployed position.

12. The front wheel deflector assembly of claim 1, wherein said at least one deflector panel is positioned in said air flow at a predetermined angle operable to direct said air flow to improve aerodynamics.

13. The front wheel deflector assembly of claim 1, further comprising a sleeve over said shaft to protect said shaft from environmental elements.

14. A front wheel deflector assembly adapted for a vehicle, comprising:
    at least one deflector panel moveable between a stowed position and at least one deployed position, wherein the deployment of the deflector panel improves aerodynamics;
    at least one deflector pivot joint, said at least one deflector panel rotatable about said at least one deflector pivot joint;
    at least one mounting member frame adapted to operably connect underneath said vehicle;
    at least one actuator operably mounted within said frame and operably coupled to said at least one deflector panel, wherein actuation of said actuator combined with rotational motion of said at least one deflector panel selectively moves said at least one deflector panel between said stowed position and said at least one deployed position into an air flow at a predetermined position operable to direct said air flow; and
    wherein said at least one actuator includes a shaft that is threaded operably coupled to said at least one deflector panel, said shaft operably translates within a static inner tube formed in a fixed housing of said at least one mounting member at a predetermined angle from vertical to selectively increase/decrease the height of said at least one actuator to extend/retract said at least one deflector panel.

15. The front wheel deflector assembly of claim 14, wherein one front wheel deflector assembly is mounted to said vehicle at a predetermined location in front of both front wheel tires of said vehicle, respectively.

16. The front wheel deflector assembly of claim 15, wherein said actuator is a linear actuator.

17. The front wheel deflector assembly of claim 16, further comprising at least one fixed panel that forms a pivot joint and said at least one deflector panel is rotatably connected at said pivot joint, wherein said at least one deflector panel rotates about said pivot joint in a first direction when said linear actuator height increases to place said at least one deflector panel into said air flow, and wherein said at least one deflector panel rotates about said pivot joint in a second direction when said linear actuator height decreases to removes said at least one deflector panel from said air flow.

18. A front wheel deflector assembly for a vehicle, comprising:
   at least one fixed mounting member frame adapted to operably couple to underneath said vehicle forward of a front wheel of said vehicle;
   at least one first panel that is fixed operably connected to said frame;
   at least one pivot joint location provided on said at least one first panel;
   at least one second panel rotatably connected to said at least one pivot joint by a pivot pin;
   at least one linear actuator operably connected to said frame and operably connected to said at least one second panel, wherein said at least one linear actuator includes a threaded shaft operably coupled to said at least one second panel, said shaft operably translates within a static inner tube formed in a fixed housing of said at least one fixed mounting member frame, disposed at a predetermined angle from vertical, to selectively increase/decrease the height of said at least one linear actuator to extend/retract said at least one second panel,
   wherein operably increasing the height of said linear actuator under power drives said at least one second panel downward as said at least one second panel rotates about said pivot joint in a first direction to move said at least one second panel into at least one deployed position within an air flow, and wherein operably decreasing the height of said linear actuator under power pulls said at least one second panel upward as said at least one second panel rotates about said pivot joint in a second direction to move said at least one second panel into a stowed when predetermined conditions requiring improved aerodynamics are no longer present.

* * * * *